US011880151B1

(12) United States Patent
Tanaka et al.

(10) Patent No.: US 11,880,151 B1
(45) Date of Patent: Jan. 23, 2024

(54) IMAGE FORMING APPARATUS AND CONTROL METHOD

(71) Applicant: TOSHIBA TEC KABUSHIKI KAISHA, Tokyo (JP)

(72) Inventors: Masaya Tanaka, Sunto Shizuoka (JP); Hiroshi Ota, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/944,097

(22) Filed: Sep. 13, 2022

(51) Int. Cl.
*G03G 15/20* (2006.01)

(52) U.S. Cl.
CPC ..... *G03G 15/2039* (2013.01); *G03G 15/2053* (2013.01)

(58) Field of Classification Search
CPC ........... G03G 15/2039; G03G 15/2053; G03G 21/1892
See application file for complete search history.

(56) References Cited

U.S. PATENT DOCUMENTS 5,768,655 A 6/1998 Yoshino et al.
2006/0018679 A1* 1/2006 Ishino .................. G03G 21/206 399/94
2007/0296778 A1* 12/2007 Snyder ..................... B41J 29/38 347/88
2014/0093266 A1* 4/2014 Narushima .......... G03G 15/205 399/82
2014/0178088 A1* 6/2014 Morisawa .......... G03G 15/2053 399/67
2014/0270834 A1* 9/2014 Seshita .............. G03G 15/2042 399/68
2014/0356038 A1* 12/2014 Arai ................... G03G 15/2017 399/329

FOREIGN PATENT DOCUMENTS

JP H07295433 A 11/1995
JP 09269713 A * 10/1997
JP 2002296967 A 10/2002
JP 2015166131 A * 9/2015 ............ B41J 29/377
JP 2018116179 A * 7/2018
JP 2021021885 A 2/2021

* cited by examiner

*Primary Examiner* — Sevan A Aydin
(74) *Attorney, Agent, or Firm* — Kim & Stewart LLP

(57) ABSTRACT

An image forming apparatus has an image forming unit to form a toner image on a first sheet and a fixing unit configured to heat the first sheet to fix the image to the first sheet. A control unit begins a cooling process for cooling the fixing unit when an overheating condition is met, then permits the image forming unit to form a toner image on a second sheet after the cooling process ends according to a first cooling condition if a person is detected near the image forming apparatus or after the cooling process ends according to a second cooling condition if a person not detected near the image forming apparatus. The cooling process under the first cooling condition ends in less time than under the second cooling condition.

20 Claims, 8 Drawing Sheets

| | NUMBER OF SHEETS PROCESSED | | |
|---|---|---|---|
| | LESS THAN 5 | 5 OR MORE AND LESS THAN 10 | 10 OR MORE |
| FIRST COOLING CONDITION | 10 SECONDS | 20 SECONDS | 30 SECONDS |
| SECOND COOLING CONDITION | 20 SECONDS | 40 SECONDS | 60 SECONDS |

IMAGE FORMING APPARATUS AND CONTROL METHOD

FIELD

Embodiments described herein relate generally to an image forming apparatus and a control method for an image forming apparatus.

BACKGROUND

When images are continuously formed on sheets having a narrow width, there will be a region (referred to as "non-passage region") of a fixing unit (sized to accommodate sheets of different sizes including wider sheets) through which the narrow width sheets do not pass and such non-passage region may become overheated and reach a high temperature since generated heat is not removed by passing sheets. Therefore, if the next sheet to be printed after a previous series of narrower sheets is wide enough to pass through what was the non-passage region during the previous printings, then toner on at least parts of the wider sheet may be overheated. Due to this, printed image defects may occur on the wider sheet. In order to avoid the occurrence of such image defects, there is a technique in which a cooling operation is executed on the non-passage region or the fixing unit more generally before the printing of the next sheet.

However, for such a cooling operation to be sufficiently executed, the period of time required for the cooling operation may be relatively long. Therefore, the user wait time required until another sheet can be printed after a user gives a printing instruction may increase. As a result, even if the quality of an image forming process can be maintained by adoption of such a cooling operation, the convenience for the user of an image forming apparatus may be reduced.

DETAILED DESCRIPTION

In general, according to one embodiment, an image forming apparatus includes an image forming unit configured to form a toner image on a first sheet in an image forming process; a fixing unit configured to heat the first sheet to fix the toner image to the first sheet; and a control unit. The control unit is configured to: begin a cooling process for cooling of the fixing unit when an overheating condition is met after the fixing of the toner image to the first sheet; permit the image forming unit to form a toner image on a second sheet after the cooling process ends according to a first cooling condition if a person is determined to be positioned in a predetermined region in the vicinity of the image forming apparatus; and permit the image forming unit to form a toner image on the second sheet after the cooling process ends according to a second cooling condition if a person is determined not to be positioned in the predetermined region in the vicinity of the image forming apparatus. The cooling process according to the first cooling condition ends in less time than the cooling process according to second cooling condition.

Figure 1:
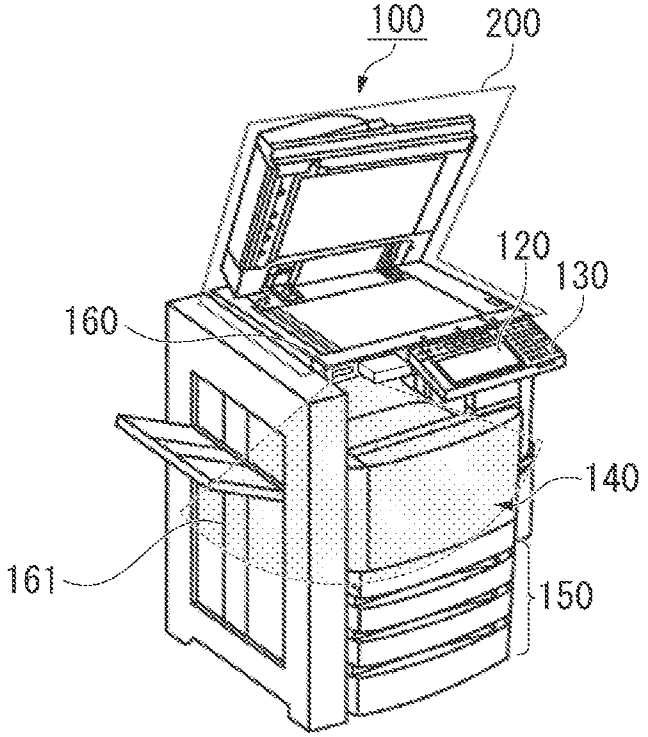
FIG. 1 depicts an image forming apparatus according to an embodiment.
Figure 2:
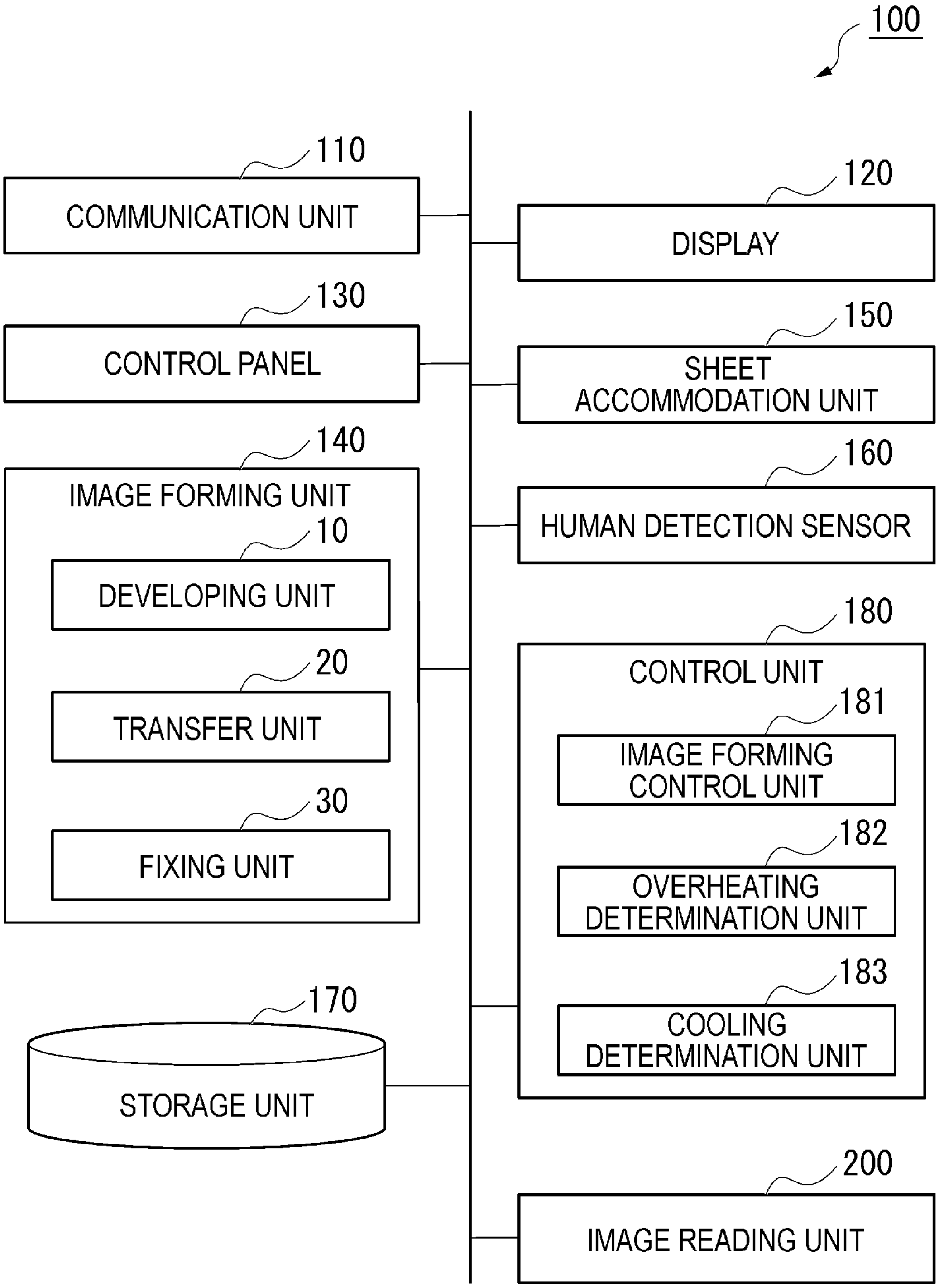
FIG. 2 is a block diagram of an image forming apparatus.

Hereinafter, an image forming apparatus and an image forming method according to certain example embodiments will be described with reference to the drawings. FIG. 1 depicts an image forming apparatus 100 according to an embodiment. FIG. 2 is a block diagram illustrating aspects of the image forming apparatus 100 according to the embodiment. The image forming apparatus 100 is, for example, a multi-function peripheral. The image forming apparatus 100 includes a communication unit 110, a display 120, a control panel 130, an image forming unit 140, a sheet accommodation unit 150, a human detection sensor 160, a storage unit 170, a control unit 180, and an image reading unit 200.

The image forming apparatus 100 forms an image on a sheet with toner. The toner is fixed to a sheet by being heated. The sheet is, for example, paper or label paper. In general, the sheet may be any material as long as the image forming apparatus 100 can form an image on a surface of the sheet.

The communication unit 110 can be a communication interface. The communication unit 110 communicates with another device via a network such as a local area network (LAN) or the Internet.

The display 120 is an image display device such as a liquid crystal display or an organic electro luminescence (EL) display. The display 120 displays various information regarding the image forming apparatus 100.

The control panel 130 includes a plurality of buttons. The control panel 130 receives an operation (input operation) of a user. The control panel 130 outputs a signal corresponding to the operation input by the user to the control unit 180. The display 120 and the control panel 130 may be integrated into a touch panel.

The image forming unit 140 forms an image on a sheet based on image information generated by the image reading unit 200 or received via a communication path. The image forming unit 140 includes a developing unit 10, a transfer unit 20, and a fixing unit 30. The image forming unit 140 forms an image through, for example, the following processes. The developing unit 10 forms an electrostatic latent image on a photoconductive drum based on the image information. The developing unit 10 applies a toner to the electrostatic latent image to form a visible image. Specific examples of the toner include decolorable toner, non-decolorable toner (typical toner), and decorative toner.

The transfer unit 20 transfers the visible image to a sheet. The fixing unit 30 applies heat and pressure to the sheet to fix the visible image to the sheet. The sheet on which the image is formed may be a sheet previously accommodated in the sheet accommodation unit 150 or a sheet that is manually fed.

The sheet accommodation unit 150 accommodates sheets to be used in the image forming unit 140.

The human detection sensor 160 detects a person who is positioned in a predetermined range in the vicinity of the image forming apparatus 100. The predetermined range where the human detection sensor 160 detects a detection target is defined to include a location where a person who acquires the sheet on which the image has been formed by the image forming apparatus 100 would normally be positioned. Therefore, the human detection sensor 160 may be attached to the front of a housing of the image forming apparatus 100. More specifically, the human detection sensor 160 may be attached to the front of the housing in the vicinity of a paper discharge tray.

The human detection sensor 160 may be configured, for example, using a sensor that detects infrared light or heat. In this case, the human detection sensor 160 detects a person by detecting infrared light (heat) generated by a human body. The human detection sensor 160 may be configured, for example, using an imaging element. In this case, the human detection sensor 160 detects a person by imaging a region of space with the imaging element and processing the obtained image. Another sensor type may be applied as the human detection sensor 160.

The storage unit 170 can be a storage device such as a magnetic hard disk device or a semiconductor memory device. The storage unit 170 stores data required to operate the image forming apparatus 100. The storage unit 170 may temporarily store data of an image to be formed by the image forming apparatus 100.

The control unit 180 can be a processor such as a central processing unit (CPU) and a memory. The control unit 180 reads a program that is stored in the storage unit 170 and executes the program. The control unit 180 controls operations of the respective units in the image forming apparatus 100. The control unit 180 functions as, for example, an image forming control unit 181, an overheating determination unit 182, and a cooling determination unit 183.

The image forming control unit 181 controls an operation of the image forming unit 140 to execute an image forming process as instructed from the user. If an overheating condition is not met, the image forming control unit 181 executes the normal image forming process. If the overheating condition is met, the image forming control unit 181 executes the image forming process only after a cooling condition is satisfied.

The overheating determination unit 182 determines whether or not the overheating condition has been satisfied. The overheating condition is a condition representing a possibility that a temperature of a part, or the entirety, of the fixing unit 30 is too high for a printing operation. One example of an overheating condition is there being a high possibility that a region (hereinafter, referred to as "passage region") of the fixing unit 30 through which a sheet passes in an image forming process to be executed includes a region presently in an overheated state. In this context, an "overheated state" refers to a state where a temperature is higher than a predetermined threshold. The predetermined threshold is a temperature at which image defects are likely to occur in a printing. For example, if the image forming process is executed using a toner, the relevant temperature may be the temperature at which the toner would be expected to clump or smear in printing.

A non-passage region in an earlier printing may become a passage region in a subsequent printing. Thus, if a non-passage region becomes overheated (due to a lack heat being removed by a passing sheet or the like) in a previous printing (or series of printings), a subsequent printing (e.g., of a wider sheet) might be performed with an overheated region as a passage region absent cooling. One specific example that demonstrates an overheating condition is the following: a width of a sheet used in an immediately previous image forming process is narrower than a width of a sheet used in an image forming process to be executed next. The width of the sheet in this context refers to sheet dimension perpendicular to the traveling direction of the sheet through the fixing unit 30.

An overheating condition in another example may be that, in addition to the above-described conditions related to sheet dimensions, the image forming process was continuously executed on a predetermined number of narrower sheets or more before the printing of the wider sheet is to be executed. Thus, in one specific example the following two conditions are satisfied: a width of a sheet used in an immediately previous image forming process is narrower than a width of a sheet used in an image forming process to be executed next; and the image forming process was continuously executed on a predetermined threshold or more sheets before the wider sheet is to be printed.

The cooling determination unit 183 determines whether or not cooling conditions have been satisfied. There may be at least two separate cooling conditions (a first cooling condition and a second cooling condition) that may be used depending on circumstance. For example, if a person is positioned in a predetermined region in the vicinity of the image forming apparatus 100, the cooling determination unit 183 determines whether or not a first cooling condition is satisfied.

For example, when the human detection sensor 160 detects a person, it may be assumed that the detected person is the person who intends to acquire a sheet discharged after an image forming process to be executed. In this case, the human detection sensor 160 may be particularly provided to detect a person positioned in the vicinity where a sheet will be discharged after executing an image forming process.

In other examples, it may be determined that a person is in the vicinity of the image forming apparatus 100 based on the receiving of an instruction of an image forming process to be executed via operation of the control panel 130. In this case, it may be determined that a person is in the relevant vicinity of the image forming apparatus 100 for some predetermined period of time after the operating of the control panel 130.

The cooling conditions are set to provide a high possibility that the temperature of a region in an overheated state will decrease to a temperature satisfying a predetermined standard for a sheet passage region of an image forming process to be executed. The first cooling condition is a condition that can be satisfied within a shorter period of time than the second cooling condition, but may consequently provide a somewhat reduced probability of error free printing. that is, the temperature of a non-passage region after the first cooling condition is satisfied is likely to be higher than the temperature of a non-passage region after the second cooling condition is satisfied. Therefore, if an image forming process is executed after only the first cooling condition is satisfied, the period of delay required before an image forming process is executed will be shorter than that experienced with the second cooling condition, but the quality of image formation is more likely to be lower than that of the second cooling condition. Conversely, if an image forming process is executed after the second cooling condition is satisfied, a period of delay required before an image forming process is executed is longer than that related to the first cooling condition, but the quality of image formation is likely to be higher than that of the first cooling condition.

The cooling condition may be referred to for simplicity as the length of a period of time over which a predetermined cooling process is executed. In this case, the first cooling condition corresponds to a shorter period of time than the second cooling condition. In a specific example, the first cooling condition may be “10 seconds has elapsed after the start of a cooling process”, and the second cooling condition may be “20 seconds has elapsed after the start of a cooling process”. In order to determine whether or not cooling conditions are satisfied, the cooling determination unit 183 counts the “elapsed time” after the cooling process starts.

One specific example of a predetermined cooling process is the following: stopping an operation of a driving unit (for example, a press roller) of the fixing unit 30 with heating of the fixing unit 30 is also stopped; driving (rotating) the driving unit (for example, a press roller) of the fixing unit 30 with heating of the fixing unit 30 stopped; and driving a fan to air-cool an overheated portion of the fixing unit 30.

The cooling conditions do not necessarily need to be defined in correspondence to any particular the length of time. For example, if the cooling process includes rotation of the driving unit or the like, the cooling condition may be defined in relation to a rotation amount (e.g., speed or number of rotations) rather than any particular length of time.

The image reading unit 200 reads image information of a reading target based on brightness and darkness of light. The image reading unit 200 records the read image information. The recorded image information may be transmitted to another information processing apparatus via a network. Based on the recorded image information, the image forming unit 140 may form an image on the sheet. The image reading unit 200 may include an ADF.

Figures 3, 4:
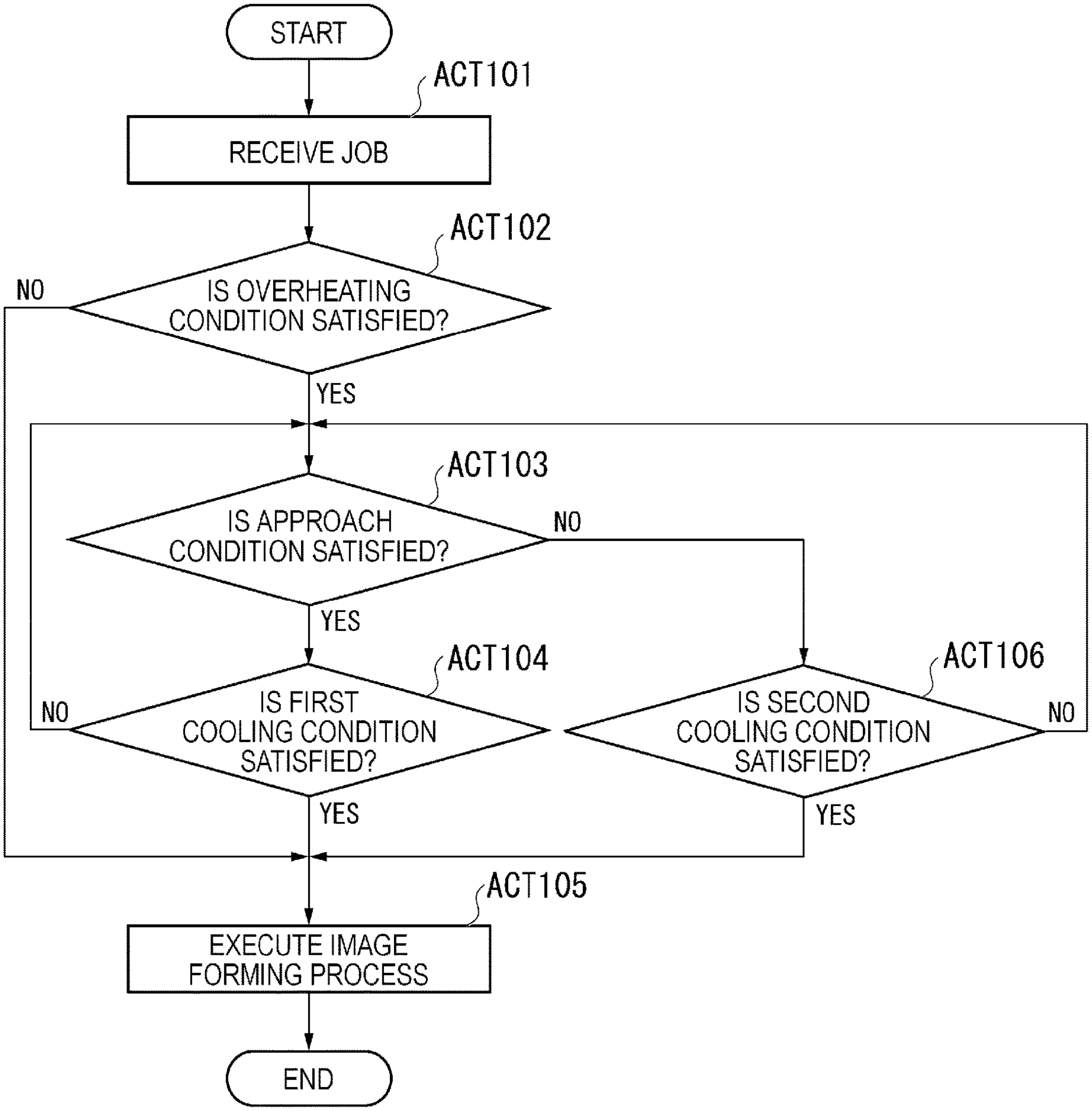
FIG. 3 is a flowchart of an operation of an image forming apparatus.
FIG. 4 is a table related to a first cooling condition and a second cooling condition in certain examples.

FIG. 3 is a flowchart illustrating a specific example of an operation of the image forming apparatus 100. If the image forming control unit 181 receives a job for an image forming process (print job) (ACT 101), the overheating determination unit 182 determines whether or not an overheating condition is satisfied (ACT 102). If an overheating condition is not satisfied (NO in ACT 102), the image forming control unit 181 executes the image forming process for the received job (ACT 105).

On the other hand, if the overheating condition is satisfied (YES in ACT 102), the cooling determination unit 183 next determines whether or not an approach condition is satisfied (ACT 103). In this context, an “approach condition” relates to whether or not a person has been detected as being in the vicinity of the image forming apparatus 100. If the approach condition is satisfied (YES in ACT 103), a user (person) is determined to be in the vicinity of the image forming apparatus 100, and the cooling determination unit 183 will then determine whether or not the first cooling condition is satisfied (ACT 104). If the first cooling condition is not satisfied (NO in ACT 104), the process returns to the determination process of ACT 103. On the other hand, if the first cooling condition is satisfied (YES in ACT 104), the image forming control unit 181 executes the image forming process (ACT 105).

If the approach condition is not satisfied (NO in ACT 103), the cooling determination unit 183 will then determine whether or not the second cooling condition is satisfied (ACT 106). If the second cooling condition is not satisfied (NO in ACT 106), the process returns to the determination process of ACT 103. On the other hand, if the second cooling condition is satisfied (YES in ACT 106), the image forming control unit 181 executes the image forming process (ACT 105).

Hereinafter, four specific examples of the operation of the image forming apparatus 100 according to an embodiment will be described.

First Specific Example of Operation

In a first specific example, the overheating condition is satisfied, but the approach condition is not satisfied during start to finish of the print job. In this case, the determination is made to use the second cooling condition as the cooling condition. Therefore, the image forming process is executed only if the second cooling condition is satisfied. As a result, a period of time required before the image forming process can be executed is longer than that which would be the case if the first cooling condition was used, but the quality of image formation is likely to be higher. In this context, the approach condition not being satisfied means that a person is not positioned in the vicinity of the image forming apparatus 100 at any point in the image forming process. Therefore, even if a period of time required to end the image forming process increases somewhat, the wait time experienced by the user does not appreciably increase since the user is not standing next to the image forming apparatus 100 waiting for the end of the print job. Therefore, even if a period of time required to end the image forming process increases somewhat, the overall satisfaction of the user can be improved by executing the image forming process with a higher quality.

Second Specific Example of Operation

In a second specific example, the overheating condition is satisfied, and the approach condition is also satisfied from start to finish. In this case, the determination is made using the first cooling condition as the cooling condition from start to finish of the print job. Therefore, the image forming process is executed when the first cooling condition is satisfied. As a result, a period of time required before the image forming process begins is shorter than that which would be the case under the second cooling condition. In this case, the quality of image formation is likely to be lower than that which would be provided if the second cooling condition was met. Since the approach condition is satisfied, it can be assumed that the person who intends to acquire a sheet discharged in an image forming process is already positioned in the vicinity of the image forming apparatus 100. Therefore, if the period of time required to complete the image forming process increases, the wait time experienced by the user increases. Accordingly, even if the quality of the image forming process decreases to some extent, by reducing a period of time (wait time) required to end the image forming process, the overall satisfaction of the user may be expected to be improved.

Third Specific Example of Operation

In a third specific example, the overheating condition is satisfied, but the approach condition is satisfied only at the start of the print job, but not satisfied from the middle of the operation at point of time that is still before the first cooling condition is met. In this case, the determination of whether a print job can be started is initially made by reference to the first cooling condition. But after the person leaves the vicinity of the image forming apparatus 100 after the receiving of the print job, the determination of whether to start the print job is now made by reference to the second cooling condition instead of the first cooling condition. Therefore, the image forming process is executed only after the second cooling condition is satisfied. As a result, a period of time required before the image forming process is executed is longer, but the quality of image formation is likely to be higher. Since the person initially near the image forming apparatus 100 leaves the vicinity of the image forming apparatus 100 before the start of the print job, the second cooling condition can now be used without causing an appreciable increase in user wait time. Therefore, even though a period of time required to end the image forming process increases, the wait time of the user does not noticeably increase. Therefore, even if a period of time required to end the image forming process increases, the overall satisfaction of the user can be improved by executing the image forming process with a higher quality.

Fourth Specific Example of Operation

In a fourth specific example, the overheating condition is satisfied, but the approach condition is not satisfied initially. However, the approach condition is satisfied before the second cooling condition is satisfied. In this case, the determination is initially made using the second cooling condition, but is then switched to being made using the first cooling condition. Therefore, the image forming process is executed whenever the first cooling condition is satisfied. Thus, even if initially the approach condition is not satisfied, the switch can be made to using the first cooling condition after a person (a presumed user) approaches the image forming apparatus 100. As a result, the period of time before the image forming process is executed can be shorter than that required by the second cooling condition. In this case, the quality of image formation is likely to be lower than with use of the second cooling condition, but with the approach condition being satisfied indicates that a person who likely desires to receive a sheet discharged from the image forming apparatus 100 is now present. Therefore, a wait time of such a user increases if the second cooling condition is applied. Accordingly, even if the quality of the image forming process decreases to some extent, by reducing the experienced wait time, the overall satisfaction of the user can be improved.

In the image forming apparatus 100, a decrease in the quality of the image forming process and a decrease in convenience can be balanced. If a person is positioned in the vicinity of the image forming apparatus 100, the cooling process is executed until the first cooling condition is satisfied, and subsequently the image forming process is executed. Therefore, the wait time can be reduced. On the other hand, if a person is not positioned in the vicinity of the image forming apparatus 100, even if a period of time required to end the image forming process increases, the wait time of the user does not appreciably increase since the user must still approach the image forming apparatus to pick up a printed sheet. Therefore, in such a case, the image forming process can be executed with a higher quality at the cost of a longer cooling period.

Modification Example

FIG. 4 is a diagram illustrating first cooling conditions and second cooling conditions in different scenarios related to the number of sheets previously processed. As shown in FIG. 4, a plurality of values may be provided as each of the first cooling condition and the second cooling condition. For example, a plurality of values may be provided depending on the number of sheets printed in succession in an immediately previous image forming process. In the example of FIG. 4, the first cooling condition and the second cooling condition are defined as duration times of the cooling process or cooling down periods.

In the example of FIG. 4, if the number of sheets previously processed is in a range of 1 to 4, the duration time for the first cooling condition is 10 seconds. If the number of sheets processed is in a range of 5 to 9, the duration time for the first cooling condition is 20 seconds. If the number of sheets processed is 10 or more, the duration time for the first cooling condition is 30 seconds.

In the example of FIG. 4, if the number of sheets processed is in a range of 1 to 4, the duration time for the second cooling condition is 20 seconds. If the number of sheets processed is in a range of 5 to 9, the duration time for the second cooling condition is 40 seconds. If the number of sheets processed is 10 or more, the duration time for the second cooling condition is 60 seconds.

With such settings, the wait time can appropriately be varied in view of the likely extent of overheating. In the example of FIG. 4, a plurality of values are defined in relation to the number of sheets previously processed. However, a plurality of values may be set in relation to the measured or estimated temperature of a non-passage region.

Another modification example will be described. For example, if an execution instruction of an image forming process is given by operating the control panel 130, the cooling determination unit 183 may cause the display 120 to execute a display screen asking the user to whether a reduced wait time is preferred. At this time, for example, on the control panel 130, a button for giving an instruction “to reduce the wait time” and a button for giving an instruction “not to reduce the wait time” may be provided. If the button for giving an instruction “to reduce the wait time” is pressed, the cooling determination unit 183 executes the determination process using the first cooling condition. If the button for giving an instruction “not to reduce the wait time” is pressed, the cooling determination unit 183 executes the determination process using the second cooling condition.

Next, specific examples of a fixing unit 30 that may be used in an image forming apparatus 100 according to the embodiment will be described.

First Specific Example of Fixing Unit

Figure 5:
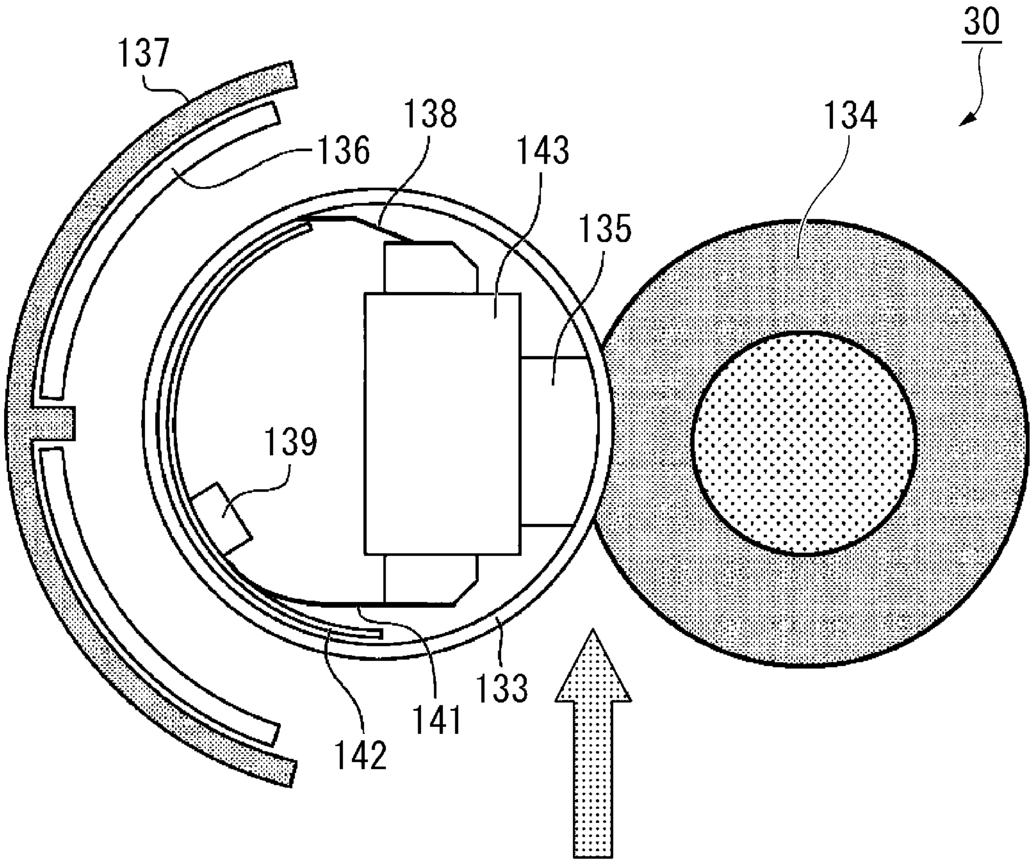
FIG. 5 is a diagram illustrating a first specific example of a fixing unit.

FIG. 5 is a diagram illustrating a first specific example of a fixing unit 30. The fixing unit 30 includes a fixing belt 133, a pressurization roller 134, a pressurization pad 135, an inductive heating (IH) coil 136, a ferrite core 137, a thermistor 138, a thermostat 139, a thermistor 141, a magnetic alloy shunt 142, and a support unit 143. An arrow illustrated in FIG. 5 indicates a conveying direction of a sheet. A heat generating layer generates heat by magnetic induction of an alternating current of power (applied power) supplied to the IH coil 136. The fixing belt 133 fixes a visible image such as a toner image to a sheet using the formed fixing nip. The pressurization roller 134 presses the pressurization pad 135 to form the fixing nip between the fixing belt 133 and the pressurization roller 134. The IH coil 136 heats the fixing belt 133 by magnetic induction of an alternating current of the supplied power. The thermistor 138 is disposed in an internal space of the fixing belt 133. The thermistor 138 detects the temperature of the fixing belt 133. The support unit 143 supports the pressurization pad 135 in the internal space of the fixing belt 133.

In the image forming apparatus 100 including the fixing unit 30 of the first specific example, the control unit 180 executes the process as illustrated in FIG. 3.

Second Specific Example of Fixing Unit

Figure 6:
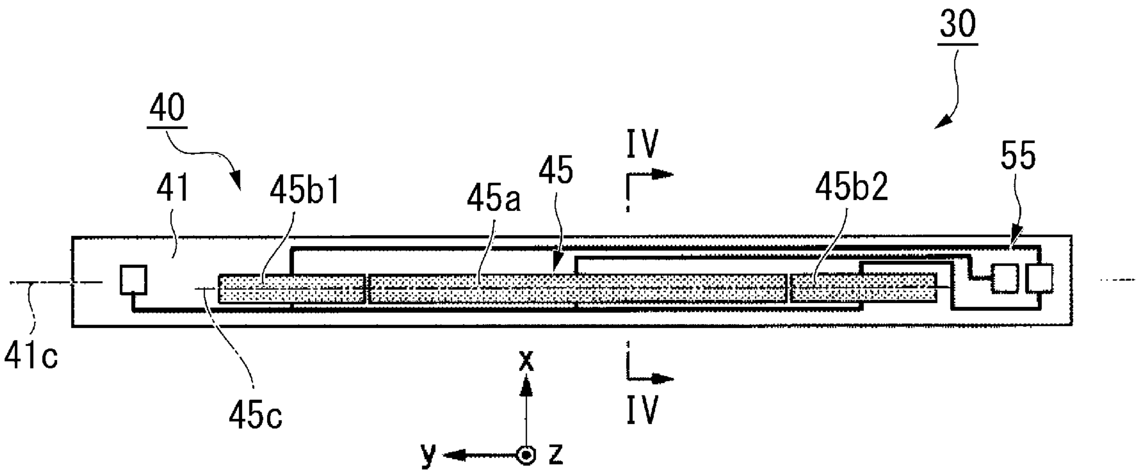
FIG. 6 is a diagram illustrating a second specific example of a fixing unit.

FIG. 6 is a diagram illustrating a second specific example of the fixing unit 30. The fixing unit 30 includes a heater unit 40. FIG. 6 is a view illustrating the fixing unit 30, in particular, the heater unit 40 when seen from the bottom. A heating element group 45 is disposed on a substrate 41. The second specific example of the fixing unit 30 includes a pressurization roller and a film unit in a manner similar to that depicted in FIG. 7 (for the third specific example of the fixing unit). The pressurization roller forms a nip between the pressurization roller and the film unit. In FIG. 6, a sheet is conveyed in the x direction. The pressurization roller presses a toner image of a sheet in the nip. The pressurization roller rotates and conveys the sheet.

The heating element group 45 is arranged on the substrate 41. The heating element group 45 is formed of a silver-palladium alloy or the like. The external shape of the heating element group 45 is formed in a rectangular shape in which the longitudinal direction is the y direction, and the transverse direction is the x direction. The heating element group 45 includes a plurality of heating elements (**45*b*1, 45*a*, 45*b*2) provided along the y direction. The heating element group 45 includes a first end heating element 45*b*1, a center heating element 45*a*, and a second end heating element 45*b*2 that are arranged along the y direction. The center heating element 45*a* is at the center portion of the heating element group 45. The first end heating element 45*b*1 is in the +y direction from the center heating element 45*a* and at the +y direction end of the heating element group 45. The second end heating element 45*b*2 is in the −y direction from the center heating element 45*a* and at the −y direction end of the heating element group 45**.

The heating element group 45 is energized to generate heat. A sheet having a small width in the y direction passes through just the center portion of the fixing unit 30. In this case, the control unit 180 causes only the center heating element **45*a* to generate heat. However, in the case of a sheet having a large width in the y direction, the control unit 180 causes the entire heating element group 45 to generate heat. That is, the center heating element 45*a* can be controlled to generate heat independently of the first end heating element 45*b*1 and the second end heating element 45*b*2. The first end heating element 45*b*1 and the second end heating element 45*b*2** may be controlled collectively or independently from each other.

In an image forming apparatus 100 including the fixing unit 30 of the second specific example, even if only some of the plurality of heating elements **45*b*1, 45*a*, 45*b*2 are controlled to generate heat independently from each other, region of a heating element that does not generate heat may still be heated by thermal conduction from an adjacent heating element region. As a result, the heating element region that does not generate heat may still enter an overheated state. However, the control unit 180 may execute the process as illustrated in FIG. 3** such that a decrease in the quality of the image forming process and a decrease in convenience can be suppressed.

Third Specific Example of Fixing Unit

Figure 7:
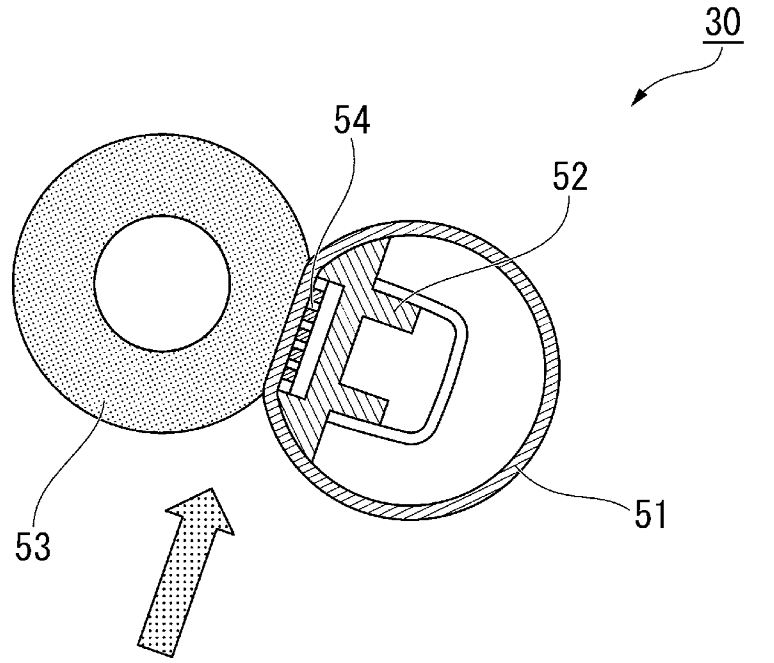
FIG. 7 is a diagram illustrating a third specific example of a fixing unit.
Figure 8:
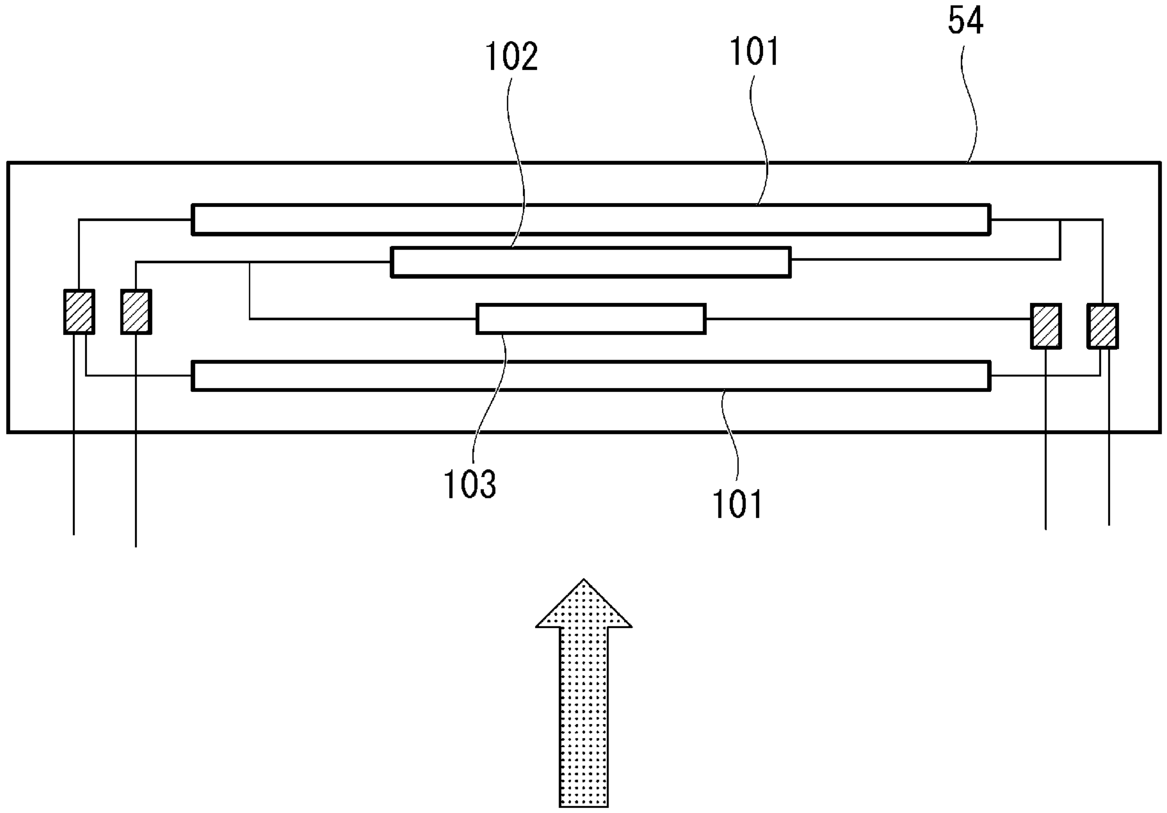
FIG. 8 is a diagram illustrating additional aspects of a third specific example of a fixing unit.

FIGS. 7 and 8 are diagrams illustrating a third specific example of the fixing unit 30. A fixing unit 30 in this example includes a film 51, a nip forming member 52, a pressurization roller 53, and a heater 54. The film 51 is a first rotating body. The nip forming member 52 forms a nip between the film 51 and the pressurization roller 53. The pressurization roller 53 is a second rotating body. The pressurization roller 53 forms a nip portion between the film 51 and the pressurization roller 53. The heater 54 includes a plurality of heating elements. The heater 54 is in contact with an inner surface of the film 51. The nip portion is formed in the vicinity of the heater 54. Arrows illustrated in FIGS. 7 and 8 indicate a traveling direction of a sheet.

The heater 54 includes at least one heating element. For example, the heater 54 includes heating elements 101, 102, 103. The heating elements 101 to 103 are on a ceramic substrate. The heating elements 101 to 103 are resistors that generate heat by power supply from an alternating current power supply. The heating elements 101 to 103 are arranged along the traveling direction of the sheet. The heating element 101 is used for fixing toner to a sheet having the maximum width that can be processed by the fixing unit 30. For example, the dimension of the heating element 101 in the longitudinal direction (perpendicular to the sheet traveling direction) may be set to be longer than 215.9 mm (the width of LTR size paper) by several millimeters. The heating element 102 is a heating element corresponding in size (longitudinal dimension) to, for example, the width of B5 size paper. The dimension of the heating element 102 in the longitudinal direction may be set to be longer than 182 mm (the width of B5 size paper) by several millimeters. The heating element 103 is a heating element corresponding in size (longitudinal dimension) to, for example, the width of A5 size paper. The dimension of the heating element 103 in the longitudinal direction may be set to be longer than 148 mm (the width of A5 size paper) by several millimeters. The rated power of the heating elements 102 and the heating element 103 is lower than the rated power of the heating element 101. In some examples, the heating element 101 may be used as a primary heater, and the heating elements 102 and 103 may be used as sub-heaters (secondary heaters). During start-up, the primary heater and the sub-heaters may both be used.

In the image forming apparatus 100 including the fixing unit 30 of the third specific example, even if the heating elements are arranged along the traveling direction of the sheet, some of the heating elements can be controlled as a main heater, and the other heating elements can be controlled as sub-heaters, and thus there may be occasions when a heating element region that is not used to generate heat is still heated by thermal conduction of an adjacent heating element. As a result, the heating element(s) not being used to generate heat may enter an overheated state. However, the control unit 180 may still executes the process as illustrated in FIG. 3 such that a decrease in the quality of the image forming process and a decrease in convenience can be suppressed.

Fourth Specific Example of Fixing Unit

Figure 9:
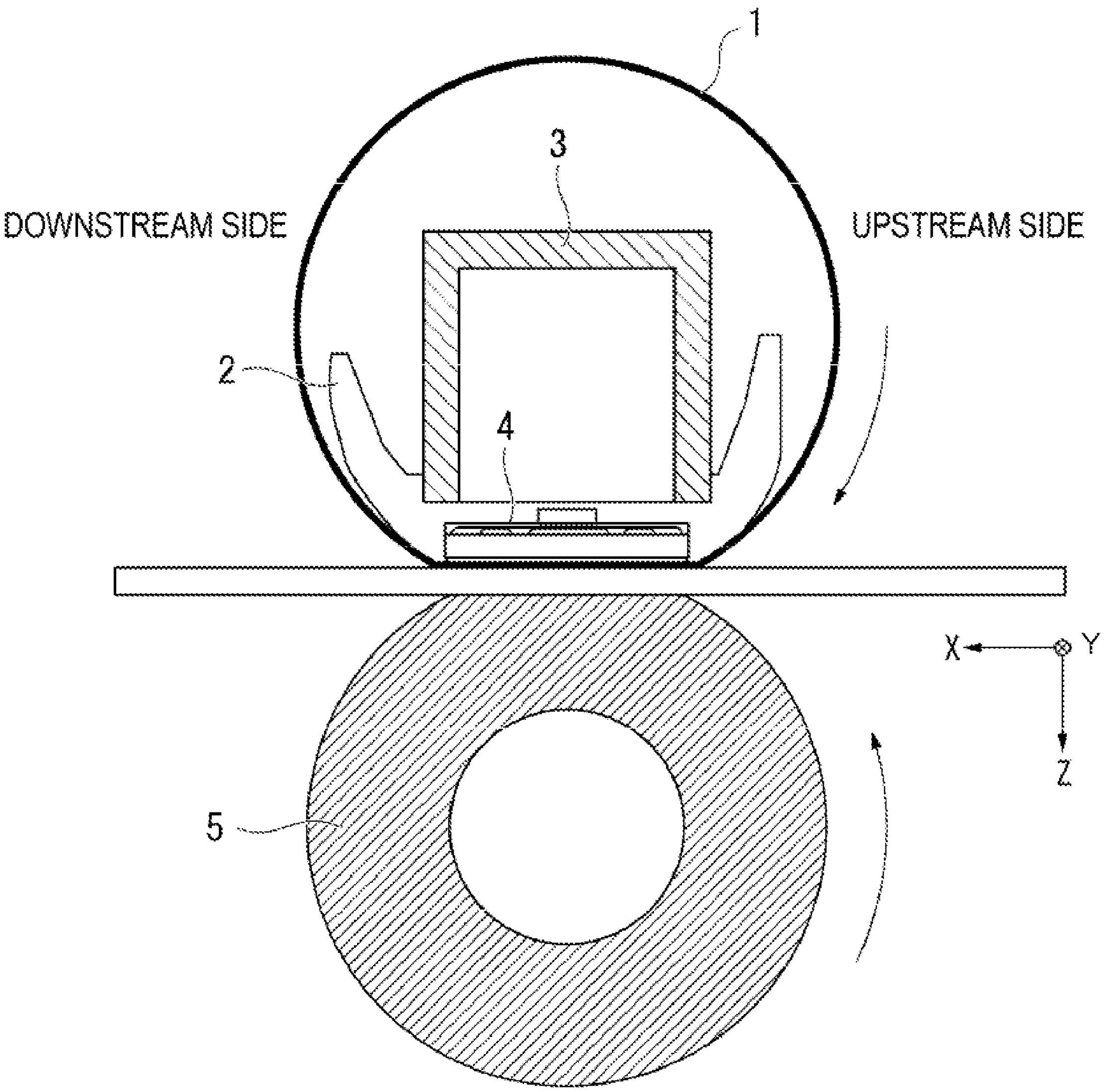
FIG. 9 is a diagram illustrating a fourth specific example of a fixing unit.
Figure 10:
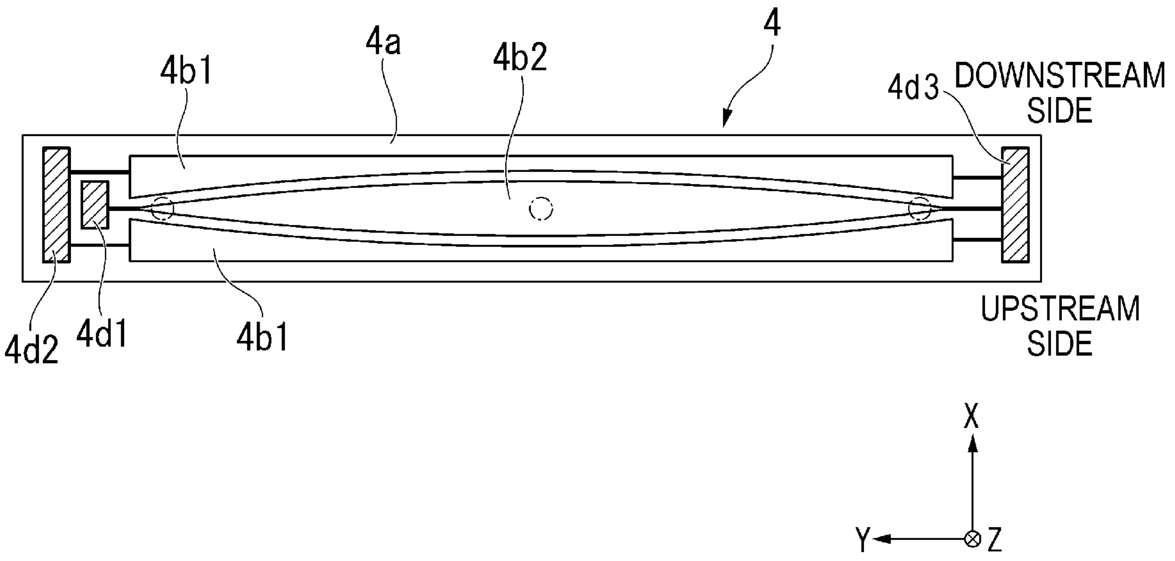
FIG. 10 is a diagram illustrating additional aspects of a fourth specific example of a fixing unit.

FIGS. 9 and 10 are diagrams illustrating a fourth specific example of the fixing unit 30. The fixing unit 30 illustrated in FIG. 9 is a film heating type device. The fixing unit 30 includes a cylindrical film 1 (fixing member), a holder 2 (support member), a stay 3 (reinforcement member), a ceramic heater 4 (heating member), a roller 5 (pressurizing member), and a flange (restriction member).

The ceramic heater 4 includes an elongated ceramic substrate **4*a*. On a flat surface of the substrate 4*a* on the holder 2 side, a first resistance heating element 4*b*1 (main heating element) that can be energized to generate heat is provided extending along a longitudinal direction of the substrate 4*a*. The substrate 4*a* may be, for example, an aluminum nitride substrate. The first resistance heating element 4*b*1 may be provided, for example, as an upstream side portion and a downstream side portion that are separated from one another in a sheet conveying direction X on the substrate 4*a***.

On the flat surface of the substrate **4*a* on the holder 2 side, a second resistance heating element 4*b*2 (sub heating element) that can be energized to generate heat may be further provided. For example, the second resistance heating element 4*b*2 may be provided extending along the longitudinal direction of the substrate in the center of the substrate 4*a* between the upstream side portion and the downstream side portion of the first resistance heating element 4*b*1**.

The heating element **4*b*1 and the heating element 4*b*2 may be formed on the substrate 4*a* using a conductive paste containing a silver-palladium (Ag/Pd) alloy. Regarding the heating element 4*b*1 and the heating element 4*b*2**, for example, the thickness (Z dimension) may be about 10 μm, and the widths in the X direction may be about 1 mm.

On the flat surface of the substrate **4*a* on the holder 2 side, an electrode 4*d*1, an electrode 4*d*2, and a common electrode 4*d*3 are provided. The electrode 4*d*1 is electrically connected to one end of the heating element 4*b*2. The electrode 4*d*2 is electrically connected to one end of the heating element 4*b*1. The common electrode 4*d*3 is electrically connected to other ends of the heating element 4*b*1 and the heating element 4*b*2**.

As illustrated in FIG. 10, the width (X dimension) of the heating element **4*b*1 continuously increases from the center to an end portion along the direction Y. With this configuration, the amount of heat generated by the heating element 4*b*1 varies from the center towards the Y-direction end portions. The width (X dimension) of the heating element 4*b*2 continuously decreases from the center towards the Y-direction end portions. With this configuration, the amount of heat generated from the heating element 4*b*2** varies from the center to the Y-direction end portions.

The main heating element **4*b*1 and the sub heating element 4*b*2 may be controlled differently depending on the size of a sheet. For example, the duty ratio (on-off ratio) may be different for the main heating element 4*b*1 and sub heating element 4*b*2**.

However, in the image forming apparatus 100 including the fixing unit 30 of the fourth specific example, the non-passage region may also be heated by thermal conduction from adjacent regions. If images are continuously formed, a larger amount of heat is stored in the non-passage region accordingly. As a result, even in the non-passage region, the overheated state may occur. However, even in this case, the control unit 180 executes the process as illustrated in FIG. 3 such that a decrease in the quality of the image forming process and a decrease in convenience can be suppressed.

Other types of fixing units 30 beyond those of the specific examples may likewise be adopted in embodiments of the present disclosure in view of various requirements for cooling periods between switchovers from different types and/or sizes of sheets being printed.

While certain embodiments have been described these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image forming apparatus, comprising:

an image forming unit configured to form a toner image on a first sheet in an image forming process;

a fixing unit configured to heat the first sheet to fix the toner image to the first sheet; and a control unit configured to:

begin a cooling process for cooling of the fixing unit when an overheating condition is met after the fixing of the toner image to the first sheet, permit the image forming unit to form a toner image on a second sheet after the cooling process ends according to a first cooling condition if a person is determined to be positioned in a predetermined region in the vicinity of the image forming apparatus, and permit the image forming unit to form a toner image on the second sheet after the cooling process ends according to a second cooling condition if a person is determined not to be positioned in the predetermined region in the vicinity of the image forming apparatus, wherein the cooling process according to the first cooling condition ends in less time than the cooling process according to second cooling condition.

2. The image forming apparatus according to claim 1, wherein the overheating condition is a sheet passage region of the fixing unit for the second sheet being at a temperature higher than a predetermined threshold after the fixing of the toner image on the first sheet.

3. The image forming apparatus according to claim 2, wherein the overheating condition is a sheet non-passage region of the fixing unit for the second sheet being a portion of the sheet passage region of the fixing unit for the first sheet.

4. The image forming apparatus according to claim 1, wherein the overheating condition includes the first sheet being narrower in sheet width than the second sheet.

5. The image forming apparatus according to claim 1, wherein the overheating condition is a continuous printing of sheets before the second sheet being greater than a predetermined threshold number and the sheets before the second sheet being narrower in sheet width than the second sheet.

6. The image forming apparatus according to claim 1, further comprising:

a human detection sensor configured to detect a person positioned in the predetermined region in the vicinity of the image forming apparatus.

7. The image forming apparatus according to claim 6, wherein the human detection sensor includes an infrared sensor.

8. The image forming apparatus according to claim 1, further comprising:

an operation panel configured to receive user inputs for controlling operations of the image forming apparatus, wherein the control unit is configured to determine a person is positioned in the predetermined region in the vicinity of the image forming apparatus based on receiving of a user input at the operation panel.

9. The image forming apparatus according to claim 1, wherein the cooling process is maintaining the fixing unit in a stopped state.

10. The image forming apparatus according to claim 9, wherein the first cooling condition requires the fixing unit to be in the stopped state for a first period of time, the second cooling condition requires the fixing unit to be in the stopped state for a second period of time, and the first period of time is shorter than the second period of time.

11. A printer, comprising:

a human detection sensor configured to detect a person in a predetermined region in the vicinity of the printer;

an image forming unit configured to form a toner image on a first sheet in an image forming process;

a fixing unit configured to heat the first sheet to fix the toner image to the first sheet; and a controller configured to:

begin a cooling process for cooling of the fixing unit when an overheating condition is met after the fixing of the toner image to the first sheet, permit the image forming unit to form a toner image on a second sheet after the cooling process ends according to a first cooling condition if the human detection sensor detects a person in the predetermined region, and permit the image forming unit to form a toner image on the second sheet after the cooling process ends according to a second cooling condition if the human detection sensor does not detect a person in the predetermined region, wherein the cooling process according to the first cooling condition ends in less time than the cooling process according to second cooling condition.

12. The printer according to claim 11, wherein the human detection sensor comprises an infrared sensor.

13. The printer according to claim 11, wherein the human detection sensor is an operation panel configured to receive user input operations, and the human detection sensor detects a person in the predetermined region based on receiving of a user input operation at the operation panel.

14. The printer according to claim 11, wherein the overheating condition is a sheet passage region of the fixing unit for the second sheet being at a temperature higher than a predetermined threshold after the fixing of the toner image on the first sheet.

15. The printer according to claim 11, wherein the overheating condition includes the first sheet being narrower in sheet width than the second sheet.

16. A control method for an image forming apparatus, the control method comprising:

starting a cooling process for cooling a fixing unit of the apparatus if an overheating condition representing a possibility that a temperature of a part or an entirety of the fixing unit is too high has been satisfied after the printing of a first sheet;

permitting an image forming unit of the apparatus to execute an image forming process on a second sheet after a first cooling condition for the cooling process is satisfied if a person is determined to be positioned in a predetermined region in the vicinity of the apparatus; and permitting the image forming unit of the apparatus to execute the image forming process on the second sheet after a second cooling condition for the cooling process is satisfied if a person is not determined to be in the predetermined region in the vicinity of the apparatus, wherein the cooling process according to the first cooling condition ends in less time than the cooling process according to second cooling condition.

17. The control method according to claim 16, wherein the overheating condition is a sheet passage region of the fixing unit for the second sheet being at a temperature higher than a predetermined threshold after the fixing of the toner image on the first sheet.

18. The control method according to claim 17, wherein the overheating condition is a sheet non-passage region of the fixing unit for the second sheet being a portion of the sheet passage region of the fixing unit for the first sheet.

19. The control method according to claim 16, wherein the overheating condition includes the first sheet being narrower in sheet width than the second sheet.

20. The control method according to claim 16, wherein the person is determined to be positioned in the predetermined region in the vicinity of the apparatus or not based on an output from a human detection sensor of the apparatus.

* * * * *